F. A. ELLIS.
TIRE.
APPLICATION FILED FEB. 25, 1908.
No. 903,066.
Patented Nov. 3, 1908.
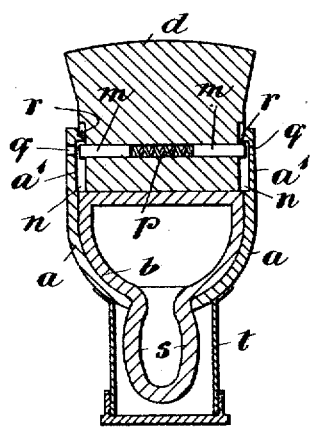
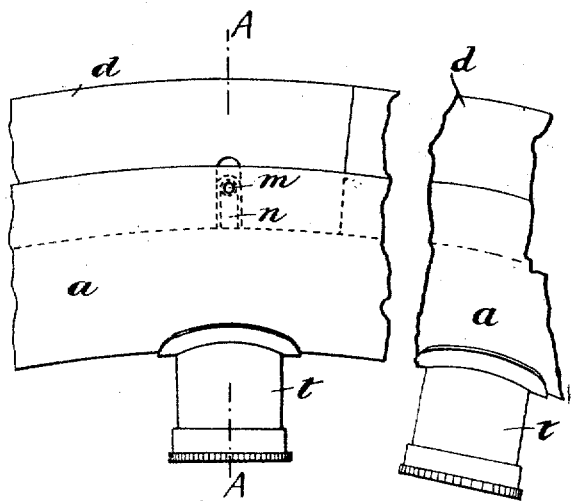
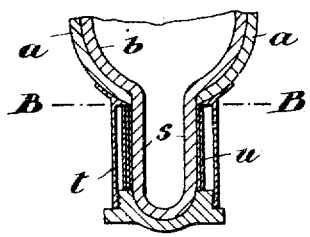
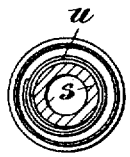
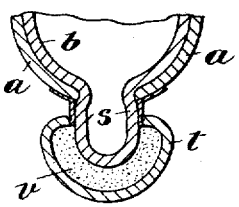
Witnesses
Stephen Edward Runyon
Frank Watkling
Inventor.
Frederick Arthur Ellis

UNITED STATES PATENT OFFICE.

FREDERICK ARTHUR ELLIS, OF LONDON, ENGLAND.

TIRE.

No. 903,066.  Specification of Letters Patent.  Patented Nov. 3, 1908.

Application filed February 25, 1908. Serial No. 417,788.

*To all whom it may concern:*

Be it known that I, FREDERICK ARTHUR ELLIS, a subject of the King of Great Britain, residing at Kennington, in the county of Surrey, London, England, have invented new and useful Improvements in Tires, of which the following is a specification.

This invention relates to improvements in and connected with the tires of automobiles and other vehicles. And in order that the said invention may be fully understood I will proceed to describe the same with the aid of the accompanying sheet of drawings in which Figure 1 is a cross section of a tire and rim constructed in accordance with the invention, the section being taken on line A—A, Fig. 2. Fig. 2 a side elevation of part of a rim and tire corresponding to Fig. 1, Figs. 3 and 4 partial sections showing modifications of Fig. 1, and Fig. 5 a section taken on the line B—B of Fig. 3.

According to my present invention, in order to increase the efficiency of the resilient pneumatic chambers in tires, I provide in connection with the interior of such chambers one or more auxiliary expansible compartments or enlargements so constructed as to be capable of sustaining without undue distortion or expansion, the ordinary internal air pressure of the pneumatic chamber of the tire under ordinary conditions, but when a sudden jolt, blow or shock is imparted to the tire the said auxiliary compartment temporarily expands and absorbs or neutralizes the effects of such jolt, blow or shock.

For example the pneumatic chamber *b* of the tire may be provided with one such auxiliary compartment in the form of an india-rubber tee-branch or enlargement *s*, which, when the tire is in position, may extend through a hole in the bottom of the trough of the rim *a* where it may be surrounded by a suitable metallic or other casing *t*, sufficient space being provided within such casing to allow for the expansion of the india-rubber branch or enlargement *s* within safe limits. In Figs. 3 and 5 the branch or enlargement *s* is shown surrounded by a metallic spiral spring *u*, and in Fig. 4 by spongy rubber or other suitable resilient material *v* for the purpose of reinforcing its strength and securing its quick return to its normal size when the effect of the jolt, blow or shock has ceased. Two enlargements are shown in Fig. 2.

In Figs. 1 and 2 is illustrated a method of holding the segmental tread blocks *d* in place in which *m*, *m* represent spring pins the outer ends of which engage with radial guide slots *n* in the inside of the rim *a*, the pins *m* being normally forced outwards by a spring *p*. When it is desired to remove a segment the said pins are pressed inwards by means of suitable tools applied to their outer ends through holes *q* in the rim; and when it is desired to place and secure a segment in position in the rim it is only necessary to press it radially into the rim so that the ends of the pins *m* are pressed inwards by the inclined planes *r* on the rim until they come opposite the slots *n* when the spring *p* forces the pins outwards so as to engage the latter in the slots, and the segment is thereby locked in place.

Claims—

1. A pneumatic tire comprising an inflatable member having an expansible branch projecting from the interior face thereof, and a casing surrounding such branch.

2. A pneumatic tire comprising a plurality of expansible branches projecting from the interior face thereof, and means for preventing the expansion thereof under normal conditions, substantially as described.

3. A pneumatic tire comprising a plurality of expansible branches projecting from the interior face thereof, and means for limiting the expansion thereof said means comprising a spring coil around each of said branches, substantially as described.

In testimony whereof I have signed my name to this specification in the presence of two subscribing witnesses.

FREDERICK ARTHUR ELLIS.

Witnesses:
STEPHEN EDWARD GUNYON,
FRANK WALKLING.